United States Patent
Takamizawa

(10) Patent No.: US 10,520,117 B2
(45) Date of Patent: Dec. 31, 2019

(54) COOLING PIPE JOINT FOR MOTOR COOLING AND MOTOR COOLING DEVICE PROVIDED WITH COOLING PIPE JOINT

(71) Applicant: FANUC CORPORATION, Yamanashi (JP)

(72) Inventor: Suguru Takamizawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 429 days.

(21) Appl. No.: 14/503,671

(22) Filed: Oct. 1, 2014

(65) Prior Publication Data

US 2015/0097367 A1    Apr. 9, 2015

(30) Foreign Application Priority Data

Oct. 4, 2013  (JP) .................................. 2013-209614

(51) Int. Cl.
| | |
|---|---|
| *F16L 19/02* | (2006.01) |
| *F16L 19/04* | (2006.01) |
| *F16L 19/065* | (2006.01) |
| *F16L 19/075* | (2006.01) |
| *F16L 23/028* | (2006.01) |

(52) U.S. Cl.
CPC .............. *F16L 19/02* (2013.01); *F16L 19/041* (2013.01); *F16L 19/065* (2013.01); *F16L 19/075* (2013.01); *F16L 23/0286* (2013.01)

(58) Field of Classification Search
USPC ....... 285/124.5, 328, 332.1–332.3, 339, 341, 285/382, 382.7
See application file for complete search history.

(56) References Cited

U.S. PATENT DOCUMENTS

| | | | | |
|---|---|---|---|---|
| 1,883,273 | A * | 10/1932 | Zerk ..................... | F16N 27/005 138/41 |
| 2,554,585 | A * | 5/1951 | Miller ..................... | F16L 19/04 285/334.5 |
| 3,243,209 | A * | 3/1966 | Chertok ................. | F16L 27/047 285/261 |
| 3,332,708 | A * | 7/1967 | Jackson .................. | F16L 19/10 285/23 |
| 3,563,575 | A * | 2/1971 | Sanford .................. | F16L 19/08 285/323 |
| 4,529,231 | A * | 7/1985 | Greenawalt ........... | F16L 19/106 285/342 |

(Continued)

FOREIGN PATENT DOCUMENTS

| | | | |
|---|---|---|---|
| CN | 201803038 U | * | 4/2011 |
| DE | 3833535 | | 4/1990 |

(Continued)

*Primary Examiner* — Anna M Momper
*Assistant Examiner* — Fannie C Kee
(74) *Attorney, Agent, or Firm* — RatnerPrestia

(57) ABSTRACT

A cooling pipe joint which enables easy fine adjustment of the length of a cooling pipe which extends from the cooling pipe joint. The cooling pipe joint is provided with a base part, a fastening member which is fastened to the base part, a deforming member which is arranged between the base part and the fastening member, and a first slanted surface which slants with respect to a center axis. This first slanted surface presses against the deforming member by the force of fastening the fastening member to the base part and makes the deforming member deform to a direction approaching the center axis.

10 Claims, 5 Drawing Sheets

(56) References Cited

U.S. PATENT DOCUMENTS

| | | | | |
|---|---|---|---|---|
| 4,867,489 | A * | 9/1989 | Patel | F16L 19/12 285/342 |
| 6,851,729 | B2 * | 2/2005 | Gibson | F16L 19/103 285/341 |
| 7,032,935 | B1 * | 4/2006 | Levy | F16L 19/06 285/339 |
| 8,459,700 | B2 * | 6/2013 | Gill | E21B 33/038 166/242.6 |
| 2006/0284421 | A1 * | 12/2006 | Fonville | F16L 27/047 285/386 |
| 2008/0191475 | A1 * | 8/2008 | Postler | F16L 33/224 285/328 |
| 2009/0295156 | A1 * | 12/2009 | Ford | G01N 30/6026 285/384 |
| 2010/0171309 | A1 * | 7/2010 | Kainec | F16L 19/00 285/382 |
| 2012/0319400 | A1 * | 12/2012 | Ford | F16L 19/065 285/354 |

FOREIGN PATENT DOCUMENTS

| | | |
|---|---|---|
| DE | 69838115 | 4/2008 |
| JP | 05099378 | 4/1993 |
| JP | 07027264 | 1/1995 |
| JP | 11030368 | 2/1999 |
| JP | 2009144872 | 7/2009 |
| JP | 2010-268667 A | 11/2010 |
| JP | 2011169410 | 9/2011 |

* cited by examiner

COOLING PIPE JOINT FOR MOTOR COOLING AND MOTOR COOLING DEVICE PROVIDED WITH COOLING PIPE JOINT

BACKGROUND ART

1. Field of the Invention

The present invention relates to a cooling pipe joint for passing a coolant for cooling a motor and to a motor cooling device including the cooling pipe joint.

2. Description of the Related Art

Known in the art is a motor cooling device for removing heat which is generated when driving an electric motor or other motor (for example, Japanese Patent Publication No. 2010-268667A).

A motor cooling device includes a cooling pipe through which a coolant passes for cooling a motor; and a cooling pipe joint which receives a cooling pipe so as to connect the cooling pipe to a cooling jacket or other member. In such a motor cooling device, it is sometimes necessary to finely adjust the length of the cooling pipe extending from the cooling pipe joint, after assembling the motor cooling device.

However, according to a conventional cooling pipe joint, the cooling pipe was fastened to the cooling pipe joint by welding etc., thereby making it impossible to pull out the cooling pipe from the cooling pipe joint or push in the cooling pipe to the cooling pipe joint so as to finely adjust the length of the cooling pipe extending out from the cooling pipe joint.

SUMMARY OF THE INVENTION

The cooling pipe joint according to the present invention which receives a cooling pipe through which a coolant passes for cooling a motor, includes a base part having a first through hole which receives the cooling pipe; a fastening member fastened to the base part, the fastening member having a second through hole which communicates with the first through hole and which receives the cooling pipe; a deforming member arranged between the base part and the fastening member, the deforming member having a third through hole which communicates with the first through hole and second through hole and which receives the cooling pipe; and a first slanted surface slanting with respect to a center axis of the third through hole.

The first slanted surface presses against the deforming member so as to deform the deforming member in a direction approaching the center axis by the force for fastening the fastening member to the base part. The deforming member may have a second slanted surface which surface-contacts with the first slanted surface. The first slanted surface may also be formed integrally with the base part. The base part may have a recess provided to be recessed inward from the end face which faces the fastening member. This recess may include an opening of a first through hole at the bottom surface thereof, and may hold the fastening member inside thereof.

The cooling pipe joint may further include an intermediate fastening member arranged between the fastening member and the deforming member. In this case, the first slanted surface may be formed integrally with the intermediate fastening member. The base part may have a recess provided to be recessed inward from the end face which faces the fastening member. This recess may include an opening of the first through hole at the bottom surface thereof, and may hold the fastening member and intermediate fastening member inside thereof.

The cooling pipe joint may further include a ring member which tightly contacts the circumference of the cooling pipe so as to prevent the coolant from leaking outside of the cooling pipe joint. The ring member may be held in a ring holding groove formed at the fastening member.

In another aspect of the present invention, a motor cooling device includes the above cooling pipe joint.

BRIEF DESCRIPTION OF THE DRAWINGS

The above and other objects, features, and advantages of the present invention will become clearer from the following description of preferred embodiments with reference to the attached drawings, in which.

DETAILED DESCRIPTION

Figure 1:
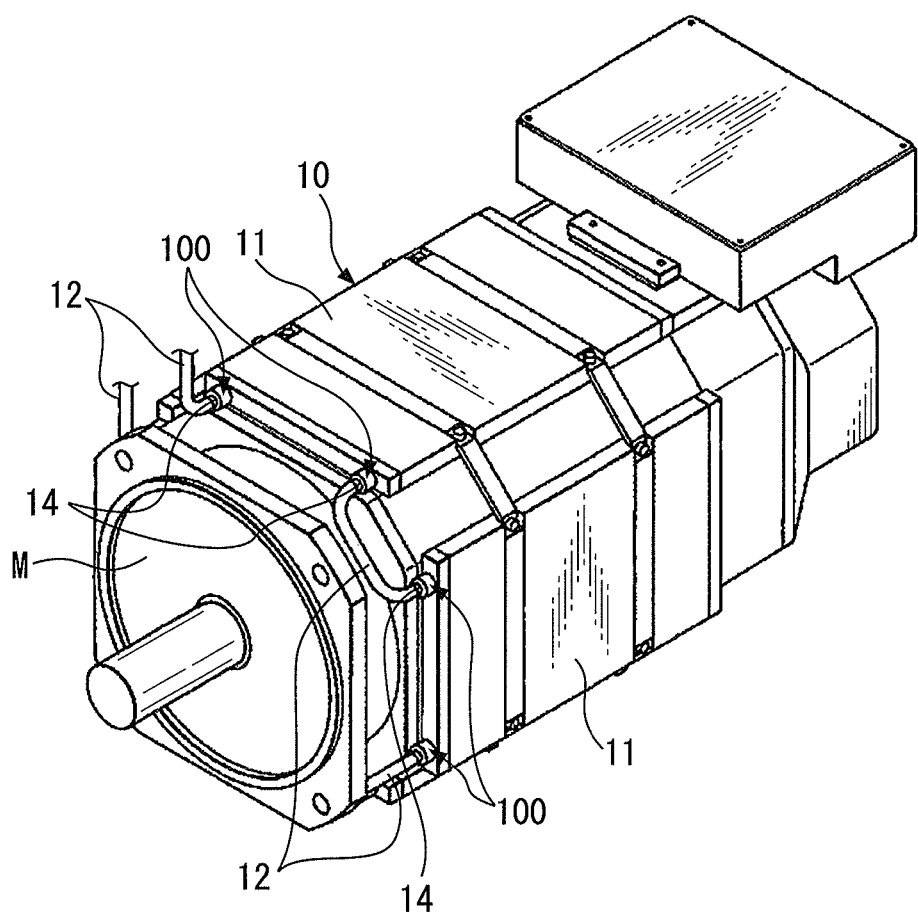
FIG. 1 is an external view of a motor cooling device according to an embodiment of the present invention.

Below, embodiments of the present invention will be explained in detail based on the drawings. First, referring to FIG. 1, a motor cooling device 10 according to one embodiment of the present invention will be explained. The motor cooling device 10 is for cooling a motor M by making a coolant flow around the motor M. The motor cooling device 10 includes a plurality of cooling jackets 11 arranged around the motor M; cooling pipes 12 connected to the cooling jackets 11; and cooling pipe joints 100 for connecting the cooling pipes 12 to the cooling jackets 11.

A plurality of the cooling jackets 11 is attached to the motor M so as to surround the motor M. The cooling jackets 11 have a coolant passage (not shown) inside thereof for passing the coolant. The coolant flows through the coolant passage and removes the heat generated in the motor M.

The cooling pipes 12 are tubular members for passing the coolant inside thereof. The cooling pipes 12 connect a coolant feed device (not shown) placed outside of the motor M and the cooling jackets 11, and also connect two cooling jackets 11 with each other, so as to enable coolant to flow. The cooling pipes 12 are connected to auxiliary joints 14 attached to the cooling pipe joints 100. The cooling pipes 12 are connected to the cooling jackets 11 via the auxiliary joints 14 and cooling pipe joints 100, and communicate with cooling pipes 13 (FIG. 2) which are arranged inside the cooling jackets 11. Thus, the coolant fed from the coolant feed device flows inside of the cooling jackets 11 via the cooling pipes 12 and 13, and removes the heat generated in the motor M.

Figure 2:
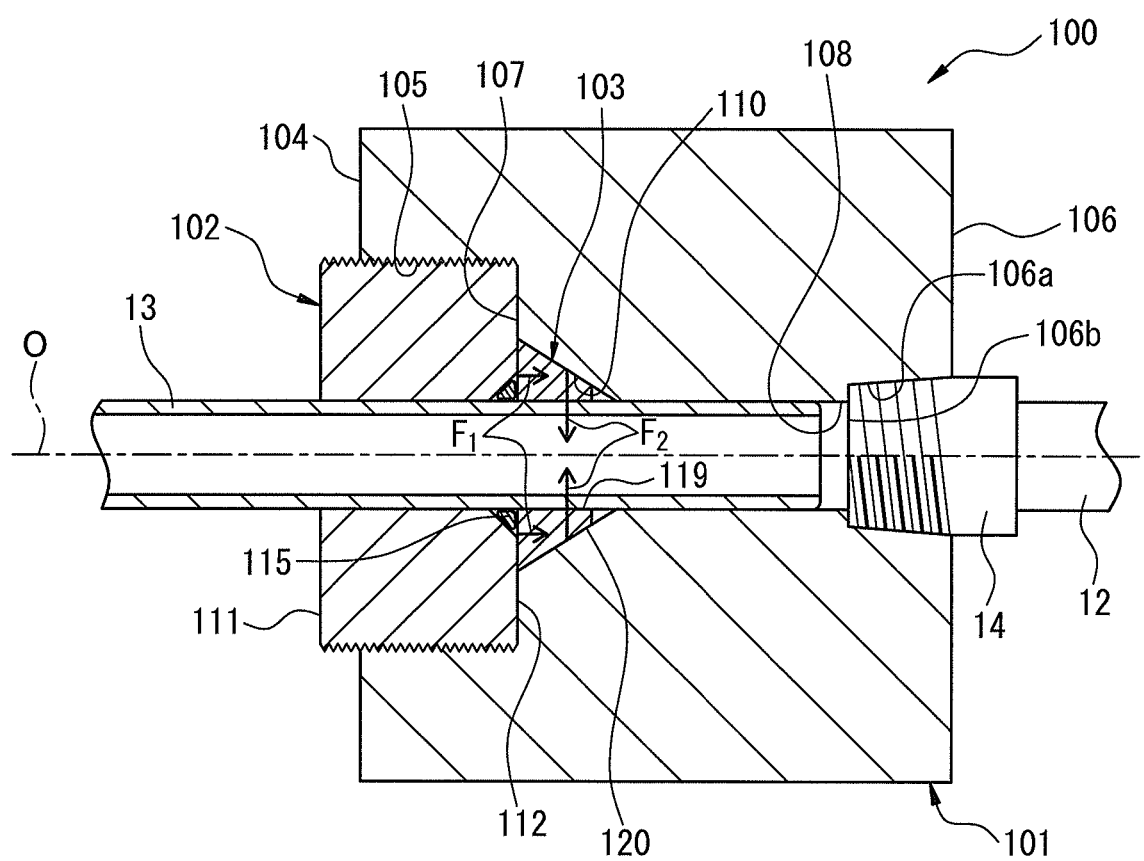
FIG. 2 is a cross-sectional view of a cooling pipe joint according to an embodiment of the present invention.
Figure 3:
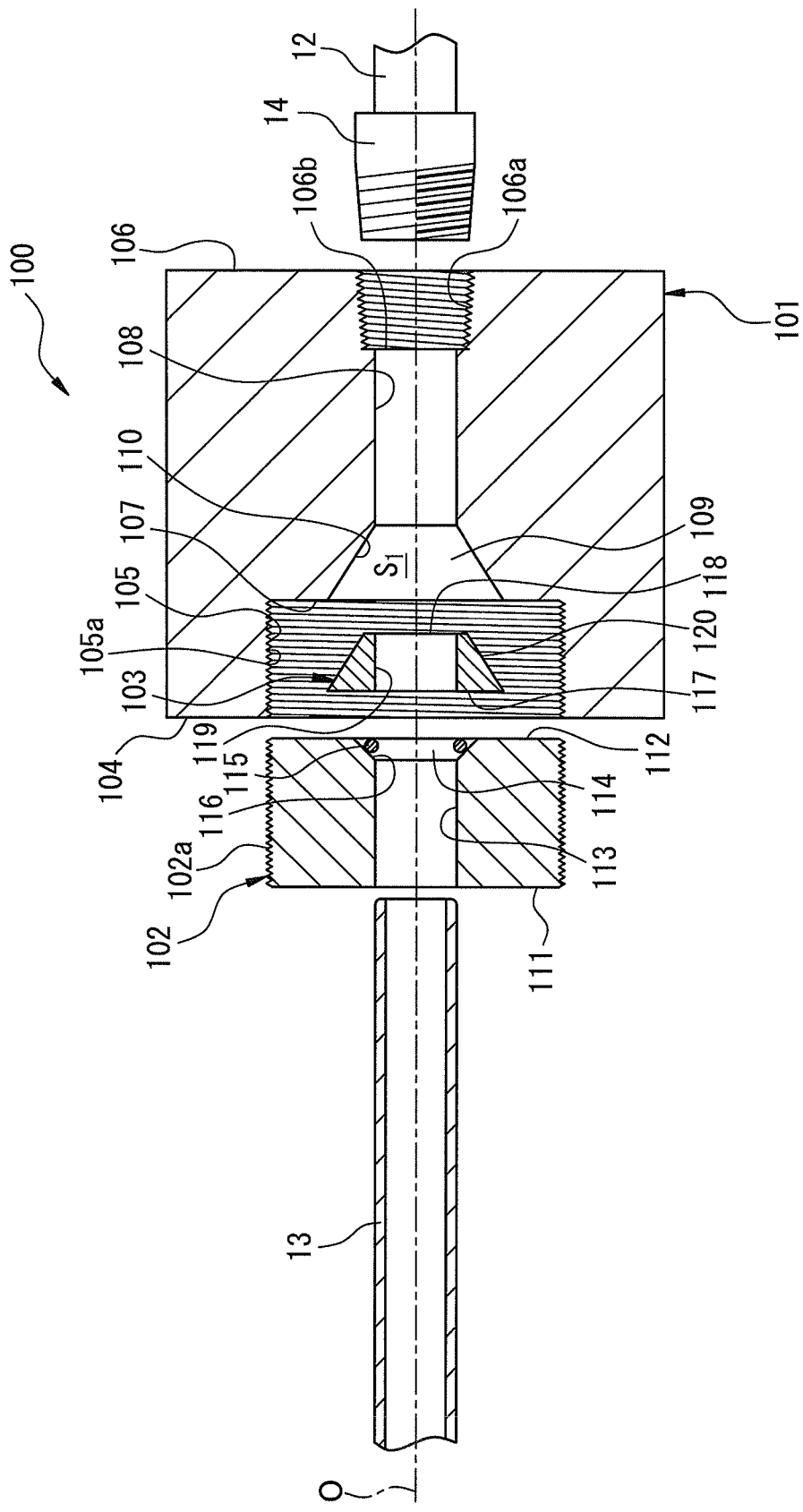
FIG. 3 is a disassembled cross-sectional view of a cooling pipe joint shown in FIG. 2.

Next, referring to FIGS. 2 and 3, a cooling pipe joint 100 according to the present embodiment will be explained. Note that, in the following explanation, the direction along a center axis O of the base part 101 is defined as the "axial direction" and the leftward in FIG. 2 is defined as the axially frontward. The cooling pipe joint 100 includes a base part 101, fastening member 102, and deforming member 103.

The base part 101 is a columnar-shaped member which has the center axis O and is made from a rigid metal. The base part 101 is fastened to the above cooling jacket 11. The base part 101 has a recess 106a which is recessed inward from an axially rear end face 106. At the side surface of the recess 106a, a thread part is formed. Through the thread part, the auxiliary joint 14 is screwed with the recess 106a for connection.

The base part 101 has a recess 105 which is recessed inward from an axially front end face 104. The recess 105 defines a columnar internal space. The side surface of the recess 105 is formed with a female thread part 105a. The base part 101 has a through hole 108 extending through the base part 101 in the axial direction from a bottom surface 106b of the recess 106a to a bottom surface 107 of the recess 105.

The through hole 108 has a somewhat larger diameter than the outer diameter of the cooling pipe 13. An opening part 109 of the through hole 108 at the axially front side is formed with a conical-shaped first slanted surface 110. The first slanted surface 110 is slanted with respect to the axis O so as to extend away from the axis O as extending toward axially frontward.

The fastening member 102 is a columnar-shaped member which is fabricated from rigid metal. The fastening member 102 is fastened to the base part 101 so that its center axis matches the center axis O of the base part 101. The fastening member 102 has a through hole 113 extending through the center of the fastening member 102 in the axial direction from an axially front end face 111 to an axially rear end face 112. The through hole 113 has a diameter which is somewhat larger than the outer diameter of the cooling pipe 13. An opening 114 of the through hole 113 at the axially rear side is formed with a ring holding groove 116 which holds an O-ring 115 at its inside.

The ring holding groove 116 according to the present embodiment is defined by a slanted surface which slants with respect to the axis O so as to extend radially outward as extending axially rearward. Further, on the outer circumferential surface of the fastening member 102, a male thread part 102a which can be screwed with a female thread part 105a provided at the base part 101 is formed.

The deforming member 103 is a frusto-conical member which is centered about the same axis as the center axis O of the base part 101 and is made from rigid metal. Preferably, the base part 101, fastening member 102, and deforming member 103 are fabricated from metals having the same rigidity and coefficient of thermal expansion (for example, the same metal). The deforming member 103 has a through hole 119 extending through the center of the deforming member 103 in the axial direction from the axially front end face 117 to the axially rear end face 118. The through hole 119 has a diameter which is somewhat larger than the outer diameter of the cooling pipe 13.

The deforming member 103 has a second slanted surface 120 as its outer circumferential surface. The second slanted surface 120 extends from the axially rear end face 118 to the axially front end face 117 while slanting with respect to the axis O so as to extend away from the axis O as extending toward axially frontward. The slant angle of the second slanted surface 120 with respect to the axis O is set to be substantially the same as the first slanted surface 110 provided at the base part 101. The slant angle of the second slanted surface 120 with respect to the axis O is set to e.g. a range of angle larger than 0° and smaller than 90°.

When assembling the cooling pipe joint 100 as shown in FIG. 2, the user firstly inserts the deforming member 103 inside a space $S_1$ defined by the first slanted surface 110 of the base part 101. When the deforming member 103 is inserted inside of the space $S_1$, the end face 117 of the deforming member 103 is positioned at somewhat the axially front side relative to the bottom surface 107 of the recess 105 of the base part 101.

Next, the user inserts the fastening member 102 into the recess 105 of the base part 101 from the axially front side, and screws in the male thread part 102a to the female thread part 105a by rotating the fastening member 102 one way in the circumferential direction about the axis O. Then, the user places the fastening member 102 at a position where the fastening member 102 lightly contacts the deforming member 103.

In this state, the through hole 108 of the base part 101, the through hole 113 of the fastening member 102, and the through hole 119 of the deforming member 103 are communicated with each other. Then, the user inserts the cooling pipe 13 into the through hole 108, the through hole 113, and the through hole 119. As explained above, the diameters of the through hole 108, the through hole 113, and the through hole 119 are set to be somewhat larger than the outer diameter of the cooling pipe 13. Accordingly, the user can smoothly insert the cooling pipe 13 into the through hole 108, the through hole 113, and the through hole 119.

Here, the user inserts the cooling pipe 13 inside the through holes 108, 113, and 119 so that the axially rear end of the cooling pipe 13 is separated from the bottom surface 106b of the recess 106a to the axially front side by a predetermined distance. Due to this, when attaching the auxiliary joint 14 to the cooling pipe joint 100 as shown in FIG. 2, it is possible to prevent the distortion of the cooling pipe 13 caused by the axially rear end of the cooling pipe 13 abutting against the auxiliary joint 14.

After inserting the cooling pipe 13 into the through hole 108, the through hole 113, and the through hole 119, the user tightly fastens the fastening member 102 at the inside of the recess 105 of the base part 10 by rotating the fastening member 102 one way in the circumferential direction and further rotating it inside the recess 105. As a result, the end face 112 of the fastening member 102 presses against the end face 117 of the deforming member 103, thereby a thrust force $F_1$ directed to the axially rear side as indicated by the arrow $F_1$ in FIG. 2 is applied to the deforming member 103.

The deforming member 103 receives the thrust force $F_1$ and the normal force from the first slanted surface 110 of the base part 101, and deforms in a direction which approaching the axial direction (i.e., radially inward), due mainly to action of the radial component $F_2$ of the normal force, etc. Due to this, the through hole 119 of the deforming member 103 is shrunk in diameter, thereby the cooling pipe 13 is fastened inside the through hole 119.

Note that, the slant angle of the first slanted surface 110 and second slanted surface 120, as well as the material of the deforming member 103, are selected so that the above deformation of the deforming member 103 occurs not in the plastic region, but in the elastic region. The O-ring 115 is held inside the ring holding groove 116 provided at the fastening member 102, and tightly contacts the circumference of the cooling pipe 13. Due to this, when running coolant through the cooling pipe 13, it is possible to prevent the coolant from passing between the fastening member 102 and the cooling pipe 13 and leaking outside of the cooling pipe joint 100.

On the other hand, after assembling the cooling pipe joint 100, if it becomes necessary to change the depth of insertion of the cooling pipe 13 inserted in the cooling pipe joint 100, the user rotates the fastening member 102 the other way in the circumferential direction to thereby loosen the fastening member 102 from the base part 101. As a result, the pressing action between the fastening member 102 and the deforming member 103 is released, and therefore the deforming member 103 returns to the state before assembly. As a result, the tightening force applied by the deforming member 103 onto the cooling pipe 13 is released, so the user can insert the cooling pipe 13 deeper into the cooling pipe joint 100, or pull the cooling pipe 13 out from the cooling pipe joint 100.

Thus, according to the cooling pipe joint 100 of the present embodiment, the cooling pipe 13 is held by elastically deforming the deforming member 103 in a reversible manner by utilizing the thrust force $F_1$ applied to the deforming member 103 when fastening the fastening member 102 to the base part 101, and also the first slanted surface 110 provided at the base part 101.

According to this configuration, the user can easily get the cooling pipe 13 held in the cooling pipe joint 100 by just fastening the fastening member 102 to the base part 101 without welding etc., while the user can also insert the cooling pipe 13 deeper into the cooling pipe joint 100 or pull it out from the cooling pipe joint 100 by just loosening the fastening member 102 from the base part 101.

The cooling pipe joint 100 with such a configuration is particularly advantageous when it becomes necessary to finely adjust the length of the cooling pipe 13 extending out from the cooling pipe joint 100, for example. More specifically, after assembling the motor cooling device 10 as shown in FIG. 1, sometimes it becomes necessary to finely adjust the position of a cooling jacket 11. In such a case, if a cooling pipe 13 were fixedly fastened to the cooling pipe joint 100, and therefore it was impossible to adjust the length of the cooling pipe 13 extending out from the cooling pipe joint 100, it would be difficult to finely adjust the position of the cooling jacket 11.

In contrast, the cooling pipe joint 100 according to the present embodiment, as explained above, enables a cooling pipe 13 to be inserted deeper into the cooling pipe joint 100 or to be pulled out from the cooling pipe joint 100 by just loosening the fastening member 102 from the base part 101. Therefore, the user can easily adjust the length of the cooling pipe 13 which extends from the cooling pipe joint 100, so it is possible to easily adjust the position of a cooling jacket 11 even after assembling the motor cooling device 10.

Next, referring to FIGS. 4 and 5, a cooling pipe joint 200 according to another embodiment of the present invention will be explained. Note that, elements similar to the above embodiment will be assigned the same reference numerals and detailed explanations thereof will be omitted. In addition, from the viewpoint of ease of understanding, in FIG. 5, the cooling pipes 12 and auxiliary joints 14 are omitted. The cooling pipe joint 200 includes a base part 201, fastening member 202, intermediate fastening member 203, and deforming member 204.

The base part 201 is a member having a center axis O and is fastened to an above-mentioned cooling jacket 11. The base part 201 includes a recess 206 recessed inward from the axially front end face 205; a recess 207a recessed inward from the axially rear end face 207; a through hole 209 extending through the base part 201 in the axial direction from the bottom surface 207b of the recess 207a to the bottom surface 208 of the recess 206; and a plurality of bolt receiving holes 210 extending through the base part 201 in the axial direction from the end face 205 to the end face 207.

Similar to the above-mentioned embodiment, an auxiliary joint 14 is connected to the recess 207a provided at the base part 201.

The fastening member 202 is a member which is centered about the same axis as the center axis O of the base part 201. The fastening member 202 has a through hole 213 extending through the center of the fastening member 202 in the axial direction from an axially front end face 211 to an axially rear end face 212. An opening 214 of the through hole 213 at the rear side in the axial direction is formed with a ring holding groove 216 which holds an O-ring 215 inside of it.

In the present embodiment, the ring holding groove 216 is formed as a columnar-shaped recess which is recessed from the circumference of the through hole 213 toward the radially outside. Further, the fastening member 202 has screw holes 217 at positions corresponding to the plurality of bolt receiving holes 210 provided at the base part 201.

The intermediate fastening member 203 is a columnar-shaped member which is centered about the same axis as the center axis O of the base part 201. The intermediate fastening member 203 has an internal space $S_2$ defined by a first slanted surface 218. The first slanted surface 218 extends from the axially rear end face 220 to the axially front end face 219 while slanting with respect to the axis O so as to approach the axis O as extending toward axially frontward.

The deforming member 204 is a frusto-conical-shaped member which is centered about the same axis as the center axis O of the base part 201. Preferably, the base part 201, fastening member 202, intermediate fastening member 203, and deforming member 204 are fabricated from metals having the same rigidity and coefficient of thermal expansion (for example, the same metal). The deforming member 204 has a through hole 223 extending though the center of the deforming member 204 in the axial direction from an axially front end face 221 to an axially rear end face 222. Further, the deforming member 204 has a second slanted surface 224 as its outer circumferential surface. The second slanted surface 224 extends from the axially rear end face 222 to the axially front end face 221 while slanting with respect to the axis O so as to approach the axis O as extending toward axially frontward.

The slant angle of the second slanted surface 224 with respect to the axis O is set to be substantially the same as the first slanted surface 218 provided at the intermediate fastening member 203. The slant angle of the second slanted surface 224 with respect to the axis O is set to e.g. a range of angle larger than 0° and smaller than 90°. Further, similar to the above embodiment, the through hole 209 of the base part 201, the through hole 213 of the fastening member 202, and the through hole 223 of the deforming member 204 have somewhat larger diameters than the outer diameter of the cooling pipe 13 in the state before assembly.

Figure 4:
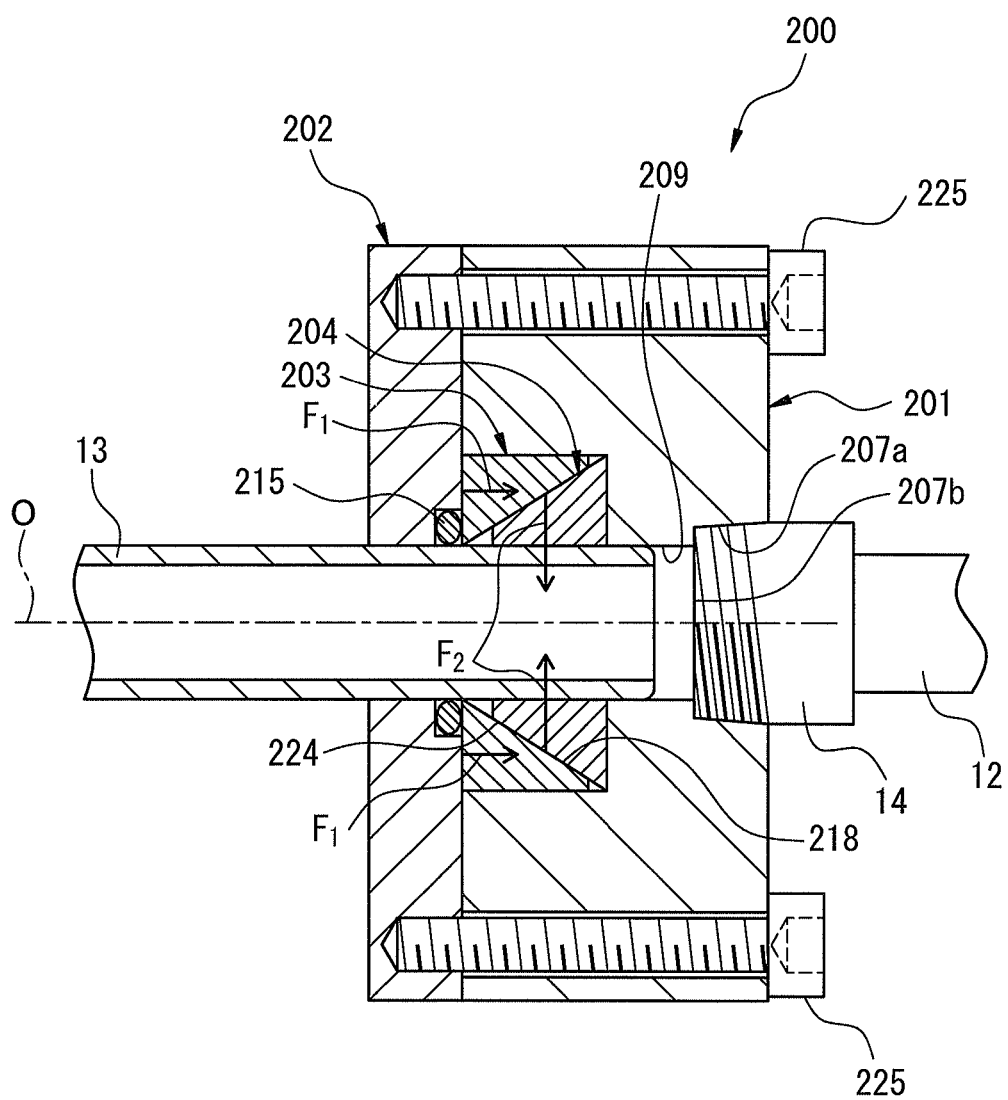
FIG. 4 is a cross-sectional view of a cooling pipe joint according to another embodiment of the present invention.
Figure 5:
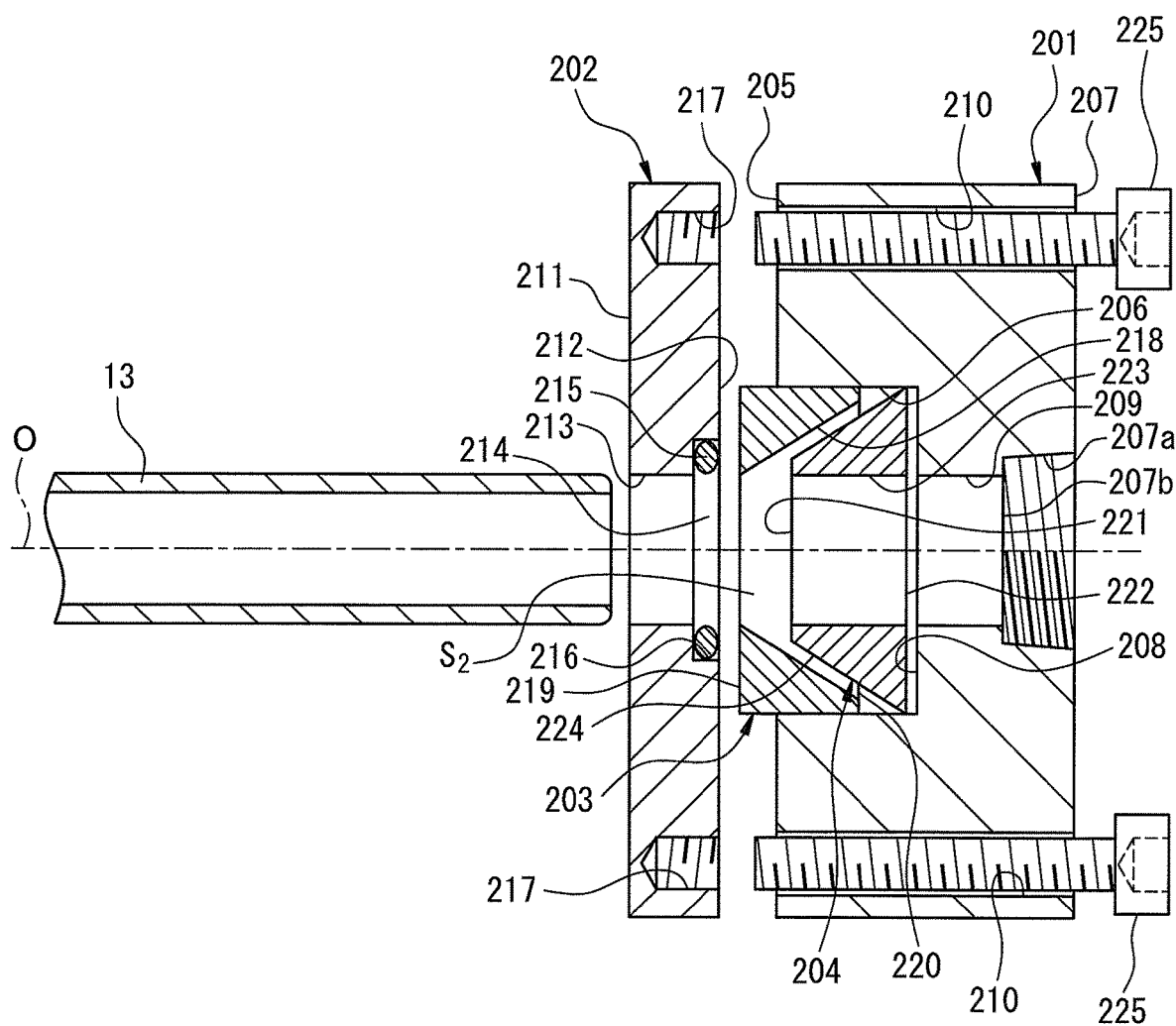
FIG. 5 is a disassembled cross-sectional view of a cooling pipe joint shown in FIG. 4.

When assembling the cooling pipe joint 200 as shown in FIG. 4, the user inserts the deforming member 204 into the internal space $S_2$ of the intermediate fastening member 203 so that the first slanted surface 218 of the intermediate fastening member 203 and the second slanted surface 224 of the deforming member 204 surface-contact with each other. Then, the user inserts the assembled intermediate fastening member 203 and deforming member 204 into the recess 206 provided at the base part 201.

When the intermediate fastening member 203 and deforming member 204 are inserted into the recess 206, the axially front end face 219 of the intermediate fastening member 203 is positioned at somewhat the axially front side relative to the axially front end face 205 of the base part 201.

Next, the user places the fastening member 202 onto the base part 201 from the axially front side, and fastens the fastening member 202 to the base part 201 by bolts 225 so that the end face 212 of the fastening member 202 lightly contacts the end face 219 of the intermediate fastening member 203. The bolts 225 pass through the bolt receiving holes 210 of the base part 201, and are screwed into the screw holes 217 of the fastening member 202.

In this state, the through hole 209 of the base part 201, the through hole 213 of the fastening member 202, and the through hole 223 of the deforming member 204 communicate with each other. Then, the user inserts the cooling pipe 13 into the through hole 209, the through hole 213, and the through hole 223. As explained above, the diameters of the through hole 209, the through hole 213, and the through hole 223 are set to be somewhat larger than the outer diameter of the cooling pipe 13. Accordingly, the user can smoothly insert the cooling pipe 13 into the through hole 209, the through hole 213, and the through hole 223.

After inserting the cooling pipe 13 into the through hole 209, the through hole 213, and the through hole 223, the user tightly fastens the fastening member 202 to the base part 201 by further tightening the bolts 225. As a result, a thrust force $F_1$ directed toward the axially rearward is applied to the intermediate fastening member 203 from the fastening member 202, as indicated by the arrow $F_1$ in FIG. 4. Due to this thrust force $F_1$, the intermediate fastening member 203 is pushed toward axially rearward, thereby the first slanted surface 218 of the intermediate fastening member 203 presses against the second slanted surface 224 of the deforming member 204.

As a result, the deforming member 204 receives a normal force from the first slanted surface 218 and deforms toward radially inward, due mainly to action of the radial component force $F_2$ of the normal force, etc. Due to this deformation of the deforming member 204, the through hole 223 of the deforming member 204 is shrunk in diameter and the cooling pipe 13 is held inside the through hole 223. At this time, the O-ring 215 is held in the ring holding groove 216 provided at the fastening member 202 and tightly contacts the circumference of the cooling pipe 13. Due to this, when running coolant through the cooling pipe 13, it is possible to prevent the coolant from leaking outside of the cooling pipe joint 200.

On the other hand, when it becomes necessary to change the depth of insertion of the cooling pipe 13 inserted into the cooling pipe joint 200, the user loosens the bolts 225. As a result, the pressing action between the intermediate fastening member 203 and deforming member 204 is released, and therefore the deforming member 204 returns to the state before assembly. As a result, the fastening force of the deforming member 204 on the cooling pipe 13 is released, thereby the user can insert the cooling pipe 13 deeper into the cooling pipe joint 200 or pull it out from the cooling pipe joint 200.

In this way, according to the cooling pipe joint 200 of the present embodiment, the user can insert the cooling pipe 13 deeper into the cooling pipe joint 200 or pull it out from the cooling pipe joint 200 by the simple work of fastening or loosening the bolts 225. Due to this, it is possible for the user to easily adjust the length of the cooling pipe 13 extending out from the cooling pipe joint 200. Therefore, it is possible for the user to perform the work of adjusting the position of a cooling jacket 11, even if after assembling the motor cooling device 10.

Note that, in the above embodiments, the case where both of the first slanted surface and the second slanted surface were conical surfaces was explained. However, the invention is not limited to this. The first slanted surface and the second slanted surface may, for example, also be truncated-pyramidal-shaped slanted surfaces such as truncated triangular pyramidal or truncated-square-pyramidal-shaped ones. Alternatively, so long as slanted surfaces which become smaller (or become larger) in cross-sectional area the further one way in the axial direction, they may be slanted surfaces which have any cross-sectional shapes.

Further, in the above embodiments, the case where the deforming member is a frusto-conical shape was explained, but the invention is not limited to this. For example, it may also be a wedge shaped member, a tapered polygonal member, etc. Further, when pressing against the first slanted surface, the deforming member easily deforms toward the inside in the diametrical direction, so it is also possible to form a slit which extends from one end face of the deforming member in the axial direction to the other side in the axial direction by exactly a predetermined distance. Further, this slit may pass through the deforming member in the diametrical direction. It is also possible to provide it to be recessed inward in the diametrical direction by exactly a predetermined distance from the second slanted surface of the deforming member.

Further, in the above embodiments, the case where the deforming member had a second slanted surface was explained. However, the invention is not limited to this. The deforming member may also be of a form, for example, a ring member, which does not have a slanted surface. The reason is that even if the deforming member does not have the second slanted surface, the first slanted surface can be pressed against to deform inside in the diametrical direction and thereby hold the cooling pipe.

Further, in the above embodiments, the case where integrally forming the first slanted surface with the base part and the case where the first slanted surface is formed at the intermediate fastening member were explained. However, the invention is not limited to this. The first slanted surface may also be formed integrally with the fastening member, while a first slanted surface may be formed at another member besides the above member and press the deforming member.

Further, in the above embodiments, the case where the ring holding groove is defined by a slanted surface which slants with respect to an axis O and the case where it is formed by a columnar shaped recess which is recessed from the wall surface of the through hole toward the outside in the diametrical direction were explained. However, the invention is not limited to this. The ring holding groove, for example, may have a surface of a shape which complementarily fits with the outer circumferential surface of the rubber ring.

As explained above, according to the present invention, rather than using welding etc., it is possible to make the deforming member reversibly elastically deform so as to make the cooling pipe be held at the cooling pipe joint, so the user can easily adjust the length of the cooling pipe which extends from the cooling pipe joint.

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

The invention claimed is:

1. A cooling pipe joint which receives a cooling pipe through which a coolant passes for cooling a motor, comprising:
 a base part having:
  a first surface;
  a second surface opposite the first surface; and
  a first through hole which extends through the base part between the first surface and the second surface, and which receives the cooling pipe;
 a fastening member fastened to the base part, the fastening member extending along an axis and having:
  a third surface defining one terminal end of the fastening member;
  a fourth surface opposite the third surface and defining the other terminal end of the fastening member, the fastening member extending along the axis from the one terminal end to the other terminal end, the third surface facing away from the fourth surface and toward the base part; and
  a second through hole which extends axially through the fastening member between the third surface and the fourth surface, the second through hole communicating with the first through hole and receiving the cooling pipe,
  the first surface being in contact with the third surface when the fastening member is fastened to the base part;
 a deforming member arranged between the base part and the fastening member, the deforming member having a third through hole which communicates with the first through hole and the second through hole and which receives the cooling pipe; and
 a first slanted surface arranged to face the deforming member and slanting with respect to a center axis of the third through hole, the first slanted surface pressing against the deforming member so as to deform the deforming member in a direction approaching the center axis by a force for fastening the fastening member to the base part, wherein
 the base part, the fastening member, and the deforming member are fabricated from metals having the same rigidity and the same coefficient of thermal expansion.

2. The cooling pipe joint according to claim 1, wherein the deforming member has a second slanted surface which surface-contacts with the first slanted surface.

3. The cooling pipe joint according to claim 1, wherein the first slanted surface is formed integrally with the base part.

4. The cooling pipe joint according to claim 3, wherein the base part further has:
 a cylindrical side face extending from the first surface in a direction away from the second surface; and
 a fifth surface adjoining an end of the cylindrical side face opposite the first surface,
wherein a recess is defined by the first surface and the cylindrical side face so as to be recessed inward from the fifth surface of the base part, and
wherein the recess holds the fastening member inside thereof.

5. The cooling pipe joint according to claim 1, further comprising an intermediate fastening member arranged between the fastening member and the deforming member, wherein
 the first slanted surface is formed integrally with the intermediate fastening member.

6. The cooling pipe joint according to claim 5, wherein the base part further has:
 a cylindrical side face extending from the first surface in a direction away from the second surface; and
 a fifth surface adjoining an end of the cylindrical side face opposite the first surface,
wherein a recess is defined by the first surface and the cylindrical side face so as to be recessed inward from the fifth surface of the base part, and
wherein the recess holds the deforming member and the intermediate fastening member inside thereof.

7. The cooling pipe joint according to claim 1, further comprising a ring member which tightly contacts a circumference of the cooling pipe so as to prevent the coolant from leaking outside of the cooling pipe joint, wherein
 the ring member is held in a ring holding groove formed at the fastening member.

8. A motor cooling device comprising the cooling pipe joint according to claim 1.

9. The cooling pipe joint according to claim 1, wherein the base part includes a bolt receiving bole extending through the base part so as to be parallel to the first through hole, and
 the fastening member includes a screw hole provided at a position corresponding to the bolt receiving hole, the fastening member being fastened to the base part by a bolt passing through the bolt receiving hole and screwed into the screw hole.

10. The cooling pipe joint according to claim 1, wherein the fastening member is an integral one-piece member.

* * * * *